L. B. WRIGHT.
LOCKING MEANS FOR MOTOR VEHICLES.
APPLICATION FILED DEC. 28, 1920.
1,421,054.
Patented June 27, 1922.
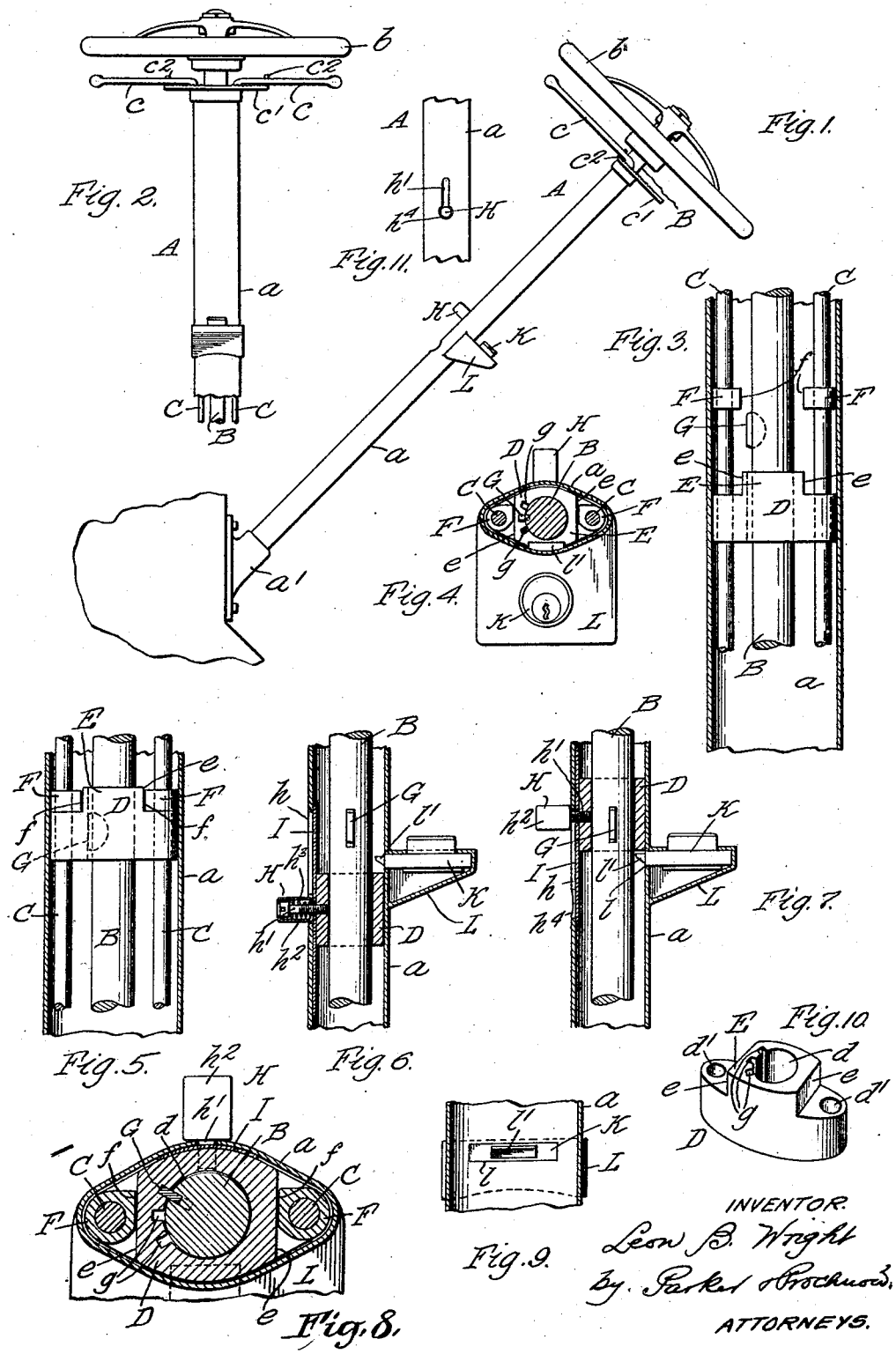
INVENTOR.
Leon B. Wright
by Parker Prochnow
ATTORNEYS.

UNITED STATES PATENT OFFICE.

LEON B. WRIGHT, OF LYNDONVILLE, NEW YORK.

LOCKING MEANS FOR MOTOR VEHICLES.

1,421,054. Specification of Letters Patent. Patented June 27, 1922.

Application filed December 28, 1920. Serial No. 433,570.

*To all whom it may concern:*

Be it known that I, LEON B. WRIGHT, a citizen of the United States, residing at Lyndonville, in the county of Orleans and State of New York, have invented a new and useful Improvement in Locking Means for Motor Vehicles, of which the following is a specification.

This invention relates to locking devices of the sort used on motor vehicles for preventing their theft or unauthorized use, and especially to that sort of locking devices which are arranged to prevent, when required, the actuation of the steering post and engine control devices. The invention is particularly adapted for use on "Ford" or other motor vehicles, in which the spark and throttle control rods are located in a hollow steering column or housing at the sides of the steering post.

Some of the objects of the invention are to provide an improved and reliable device of this sort which is very inexpensive and comprises very few and simple parts but is strong and durable, and which can be easily installed on vehicles in use at small expense by an ordinary mechanic, with only slight changes in or fitting to the regular equipment of the vehicle.

Other objects are to provide a device of this sort with means whereby it may be operated to lock the vehicle by a single movement of the locking member, without the use of a key or other device, but in which the use of a proper key or unlocking means is necessary to unlock the device to release the vehicle.

A still further object of the invention is to improve locking devices of the character stated in the other respects hereinafter described and set forth in the claims.

In the accompanying drawings:

Fig. 1 is a side elevation of the steering column of an automobile, equipped with a locking device embodying the invention.

Fig. 2 is a fragmentary rear elevation thereof.

Fig. 3 is a transverse sectional elevation of a portion of the steering column, showing parts of the locking device in their inoperative or released position.

Fig. 4 is a sectional plan view thereof showing the locking device in its inoperative position.

Fig. 5 is a view similar to Fig. 3, but showing the locking device in locking position.

Fig. 6 is a fragmentary sectional elevation thereof at right angles to Fig. 3 and with the parts in similar positions.

Fig. 7 is a sectional elevation at right angles to Fig. 5 and with the parts in like positions.

Fig. 8 is a fragmentary sectional plan view, on an enlarged scale, showing the parts in operative or locked position.

Fig. 9 is a fragmentary sectional elevation of the steering column showing the manner of securing the lock thereto.

Fig. 10 is a perspective view of the sliding block of the locking device.

Fig. 11 is a fragmentary front elevation of the steering column.

The steering column A shown in the drawings, is of a known form, comprising a tubular housing $a$ of substantially elliptical cross section, secured by a base fitting $a'$ to the dash of the vehicle and enclosing the steering post B and control rods C. The control rods C, as usual in this type of steering column, are arranged on opposite sides of and parallel with the steering post B and are equipped at their upper ends with actuating handles or levers $c$ which swing over the toothed holding sector $c'$ and engage stops $c^2$ at the opposite ends thereof when in their "off" or inoperative positions. The usual steering wheel $b$ is secured to the upper end of the steering post B.

A locking device for securing the steering post against rotation, preferably while in either a straight ahead or vehicle-turning position, and also for securing the control rods in their "off" position, is shown, and comprises a sliding block within the steering column adapted, when moved to one position, to engage fixed parts on the steering post and control rods to lock said post and rods in the position stated, but adapted, when in another position, to release the steering post and control rods so as to permit the usual operations thereof.

D represents the sliding locking block, which preferably conforms in horizontal cross section to the cross sectional shape of the steering column A and fits loosely therein. The block D is formed with a central hole $d$ through which the steering post B passes, and at opposite sides of the hole $d$ with two other holes $d'$ through which the control rods C pass. The block can slide up and down on the steering post and control rods, but the latter prevent the block from turning about the steering post. The locking block D is further formed with an upwardly extending, central part E surrounding the hole $d$ and having preferably flat side faces $e$ parallel with the axis of the steering column. These faces $e$ are adapted, when the parts are moved to locking position, to engage or stand in close proximity to coacting, preferably flat faces $f$ on fixed collars or parts F on the control rods C. In the unlocked or normal position of the locking block D, the collars F are above, and out of engagement with the block D, and do not interfere with the oscillation of the control rods for performing their intended functions. When, however, it is desired to lock the vehicle against unauthorized use, the control rods are moved to their "off" position with their handles in engagement with the stops $c^2$, which will bring the faces $f$ into parallelism or alinement with the faces $e$ of the sliding block. If the block D is then moved upwards to its locking position (shown in Figs. 5 and 8), the faces $e$ and $f$ will be in position to engage each other and effectually prevent rotation of the control rods. The end parts of the locking block D surrounding the control rods form stops adapted to strike against the collars F to arrest the block D when it is in proper locking relation to the collars F.

For locking the steering post B against rotation simultaneously with the locking of the control rods C, a key G is rigidly secured to the steering post B and is adapted to enter a longitudinal groove $g$ formed in the side wall of the hole $d$ of the block D when the block is raised to locking position. The key is positioned so that when the faces $e$ and $f$ are in engaging position, it will be properly engaged in the groove $g$. Preferably three of the grooves $g$ are used, so positioned that the key G will enter the central groove when the steering post is in position for a straight ahead motion of the vehicle, and will enter one or the other of the remaining two grooves when the front wheels of the vehicle have been set by the steering mechanism to turn the vehicle to the right or to the left.

The block D is moved for locking and unlocking the steering post and control rods by a handle H secured to the block D and extending out through a longitudinal slot $h$ in one side of the steering column. The handle preferably consists of a screw or stud $h'$ screwed or otherwise suitably secured to the block D and surrounded by a sleeve $h^2$ which encloses a coil spring $h^3$ surrounding the stud $h'$ between the head thereof and a shoulder at the inner end of the sleeve $h^2$. The lower end $h^4$ of the slot $h$ is enlarged sufficiently to receive the inner end of the sleeve $h^2$ so that when the locking block D is moved to its lower or unlocking position, the spring $h^3$ will cause the sleeve to snap into the slot enlargement $h^4$ and hold the locking block in its lowered position. This construction prevents accidental upward movement of the locking block and consequent unintentional locking of the control rods C or the steering post B. By pulling outwardly on the handle H, however, it can be disengaged from the slot and then moved freely upwards. I represents a guard plate secured to the locking block, preferably inside of the steering column, for closing the slot $h$ to prevent tampering with the locking device by a tool or implement inserted through the slot $h$. The guard plate I is of sufficient length to properly close the slot $h$ in either position of the locking block D.

The means shown in the drawings for retaining the locking block in locked relation to the steering post B and control rods C preferably comprises a reliable lock K, which may be of any known make but preferably having the usual spring-actuated locking bolt. This lock is housed in a casing L which is welded or otherwise permanently secured externally on the steering column A over a slot $l$ in the side of the column, through which the spring-actuated bolt $l'$ of the lock K projects into the steering column, above the upper edge of the block D when said block is in its unlocked position. The beveled edge of the spring bolt $l'$ faces downwardly and when the block D is moved upwardly it will engage the beveled face of the bolt $l'$ and shove the bolt back to permit the block D to pass. As soon as the lower edge of the block passes the bolt, the bolt will spring into locking position beneath the block D and retain the parts in locked position. To retract the bolt $l'$ and release the locking block, a key must be inserted into the lock and turned. A combination lock or any other suitable sort of lock could, of course, be used, if preferred, in place of a key-actuated lock.

The described construction makes it impossible to place the parts in locking relation, except when the control rods C are in their neutral or "off" positions, and if desired, the steering post can be locked in a position to hold the front wheels of the vehicle turned to one side or the other, thus making theft of the vehicle still more difficult. The locking block can be placed into operative position by merely moving the handle H outwardly and upwardly without the use of a key, but the device cannot be unlocked except by the operation of the lock K by means of the proper key or actuating member. Also the described way of securing the casing for the lock on the steering column reinforces the steering column against any possible weakening thereof on account of the cutting of the slots therein.

In order to apply the described locking devices to automobiles in use, it is only necessary to disconnect the steering post and control rods from their connected mechanisms and remove them from the steering column, which, as known, can be readily done. The collars F can then be slipped on the control rods C and welded or otherwise suitably fixed thereon and the key G secured by welding it in a key seat in the steering post, or otherwise. After the slots $h$ and $l$ are cut in the steering column and the lock casing L welded in place thereon, the steering post, control rods and locking block are placed in the steering column and the steering post and control rods connected up, and the handle H secured to the locking block D.

I claim as my invention:

1. In a locking device for motor vehicles, the combination with a hollow steering column enclosing a steering post and a control rod, of a sliding block slidably mounted on said post and said rod, said post and said rod each having a fixed part adapted to engage said sliding block in one position of the latter to lock said post and said rod from rotation, and a lock having a locking member which automatically engages with said sliding block when the latter has been moved into locking position to retain said block in said position.

2. In a locking device for motor vehicles, the combination with a hollow steering column enclosing a steering post and a control rod, of a sliding block slidably mounted in said steering column relatively to said post and said rod, said post and said rod each having a fixed part adapted to engage said sliding block in one position of the latter to lock said post and said rod from rotation, and a lock having a locking member located in the path of movement of said sliding block and adapted to be engaged and moved by said sliding block to permit the passage thereof to locking position, and said locking member being adapted to return automatically to position to engage and lock said sliding block in locking position.

3. In a locking device for motor vehicles, the combination with a hollow steering column enclosing a steering post and a control rod, of a sliding block slidably mounted on said post and said rod, said post and said rod each having a fixed part adapted to engage said sliding block in one position of the latter to lock said post and said rod from rotation, a lock having an enclosing casing fixed to said steering column and having a locking member extending into said steering column in the path of said sliding block and adapted to engage said sliding block when the latter is in locking position to retain said block in said position.

4. In a locking device for motor vehicles, the combination with a hollow steering column enclosing a steering post and a control rod, of a sliding block slidably mounted in said steering column and having an integral part forming a locking face engageable with a coacting locking face on a fixed part on said rod, and said post having a fixed key adapted to enter a slot in said sliding block to prevent the rotation of said post when said coacting locking faces are in engaging position.

5. In a locking device for motor vehicles, the combination with a hollow steering column enclosing a steering post and a control rod, of a sliding block slidably mounted in said steering column and having an integral part forming a locking face engageable with a coacting locking face on a fixed part on said rod, and said post having a fixed key adapted to enter a slot in said sliding block to prevent the rotation of said post when said coacting locking faces are in engaging position, means for moving said sliding block into said locking position, and means for preventing the unauthorized movement of said locking block out of locking position.

6. In a locking device for motor vehicles, the combination with a hollow steering column, a steering post and a pair of control rods arranged side by side in said column, of a sliding block movable and guided on said post and said rods, and having locking faces adapted to coact with locking faces on fixed parts on said control rods to lock said rods from movement when said block is moved to locking position, said sliding block also having a slot adapted to receive a fixed key on said post, means for moving said sliding block to and from locking position, and means for locking said sliding block in locking position.

7. In a locking device for motor vehicles, the combination with a hollow steering column enclosing a steering post and a control rod, of a sliding block slidably mounted in said steering column relatively to said post and said rod, said post and said rod each having a fixed part adapted to engage said sliding block in one position of the latter to lock said post and said rod from rotation, and a laterally projecting stud on said sliding block extending outwardly through a slot in said steering column in position to be grasped and moved in said slot to place said sliding block into and out of locking position.

8. In a locking device for motor vehicles, the combination with a hollow steering column enclosing a steering post and a control rod, of a sliding block slidably mounted in said steering column relatively to said post and said rod, said post and said rod each having a fixed part adapted to engage said sliding block in one position of the latter to lock said post and said rod from rotation, a laterally projecting stud on said sliding block extending outwardly through a slot in said steering column, a sleeve surrounding said stud, a spring within said sleeve for pressing the sleeve toward the steering column, and said slot having an enlargement to receive the inner end of said sleeve when said sliding block is in its inoperative position to prevent the unintentional actuation of said sliding block.

9. In a locking device for motor vehicles, the combination with a hollow steering column enclosing a steering post and a control rod, of a sliding block slidably mounted in said steering column relatively to said post and said rod, said post and said rod each having a fixed part adapted to engage said sliding block in one position of the latter to lock said post and said rod from rotation, a laterally projecting stud on said sliding block extending outwardly through a slot in said steering column, a sleeve surrounding said stud, a spring within said sleeve for pressing the sleeve toward the steering column, and said slot having an enlargement to receive said inner end of said sleeve when said sliding block is in its inoperative position, said sleeve being adapted to be withdrawn from said enlargement of said slot to permit the movement of said sliding block into locking position.

10. In a locking device for motor vehicles, the combination with a tubular steering column, and a steering post and control rod arranged side by side in said column, of a locking block having holes through which said steering post and rod pass loosely whereby the block can slide lengthwise in the column on said post and rod, and lateral projections fixed on said steering post and control rod and arranged to engage with fixed portions of said block in a locking position of the block and thereby prevent rotation of said steering post and rod, said block being movable to and from said locking position, and means for locking the block in said locking position.

11. In a locking device for motor vehicles, the combination with a hollow steering column enclosing a steering post and a control rod, of a block slidably mounted in said steering column relatively to said post and said rod, a fixed part on said rod and an engaging portion on said block for locking said rod from rotation in one position of said block, a fixed projection on said post and a plurality of grooves in said block adapted to receive the projection on said post in different rotative positions of said post, whereby said post may be locked from rotation in different positions, said block being movable to and from locking position, and means for locking said block in said locking position.

Witness my hand this 24 day of December, 1920.

LEON B. WRIGHT.